US009063599B2

(12) United States Patent
Yanagi et al.

(10) Patent No.: US 9,063,599 B2
(45) Date of Patent: Jun. 23, 2015

(54) INPUT DEVICE AND DISPLAY APPARATUS

(71) Applicant: ALPS ELECTRIC CO., LTD., Tokyo (JP)

(72) Inventors: Shuji Yanagi, Miyagi-Ken (JP); Eiji Umetsu, Miyagi-ken (JP); Masahiko Ishizone, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 263 days.

(21) Appl. No.: 13/868,914

(22) Filed: Apr. 23, 2013

(65) Prior Publication Data
US 2013/0234968 A1 Sep. 12, 2013

Related U.S. Application Data

(63) Continuation of application No. PCT/JP2011/068515, filed on Aug. 15, 2011.

(30) Foreign Application Priority Data

Oct. 27, 2010 (JP) .................................. 2010-241313

(51) Int. Cl.
*G06F 3/041* (2006.01)
*G01L 1/18* (2006.01)
*G01L 1/20* (2006.01)
G06F 3/01 (2006.01)
G06F 3/0488 (2013.01)

(52) U.S. Cl.
CPC ................ *G06F 3/041* (2013.01); *G06F 3/016* (2013.01); *G06F 3/0488* (2013.01); *G06F 3/0414* (2013.01); *G06F 3/0418* (2013.01); *G01L 1/18* (2013.01); *G01L 1/205* (2013.01)

(58) Field of Classification Search
CPC ...... G06F 3/0488; G06F 3/0414; G06F 3/016
See application file for complete search history.

(56) References Cited

U.S. PATENT DOCUMENTS 4,389,711 A  6/1983 Hotta et al.
4,707,845 A  11/1987 Krein et al.

FOREIGN PATENT DOCUMENTS

| JP | 63-58528 | 3/1988 |
| JP | 63-147217 | 6/1988 |
| JP | 5-250086 | 9/1993 |
| JP | 6-318128 | 11/1994 |
| JP | 8-50528 | 2/1996 |
| JP | 11-305931 | 11/1999 |
| JP | 2005-332063 | 12/2005 |

OTHER PUBLICATIONS

Search Report dated Sep. 20, 2011 from International Application No. PCT/JP2011/068515.

Primary Examiner — Kent Chang
Assistant Examiner — Chayce Bibbee
(74) Attorney, Agent, or Firm — Beyer Law Group LLP

(57) ABSTRACT

There is provided an input device including: means for performing zero point correction on the sensor outputs of the load sensors when an absolute value of an amount of output change of each load sensor is not more than a predetermined threshold a during a certain period of measurement time; means for calculating position data and calculating a total load Z of the load sensors by using the sensor outputs; means for determining that the calculation data pieces are normal when the absolute value |dZ/dt| of the amount of change in the total load Z is not more than the threshold β; means for determining that an input is present in the calculation data pieces when the absolute value |Z| of the total load is not less than the threshold γ; and means for removing a predetermined number of first and last data pieces in the calculation data pieces.

13 Claims, 6 Drawing Sheets

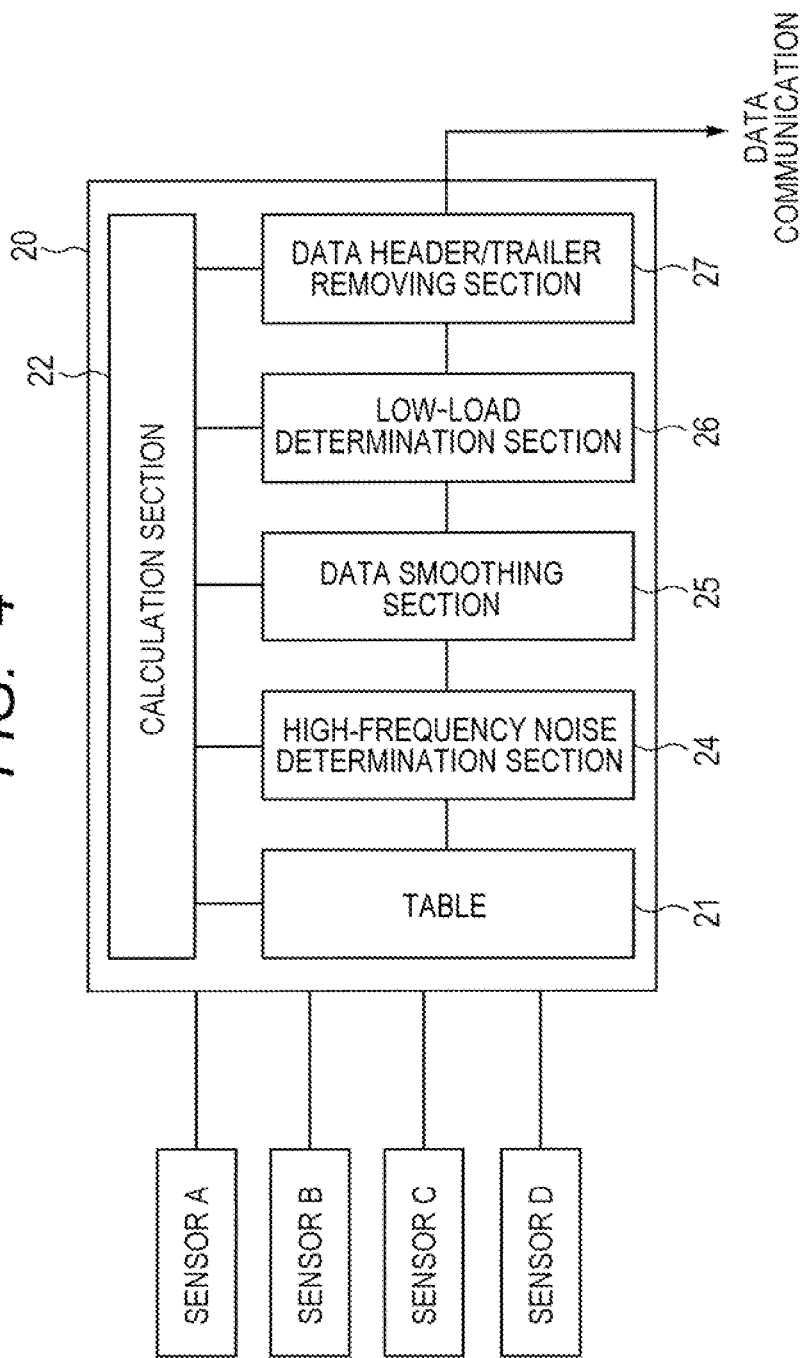

FIG. 8

| POSITION | | SENSOR OUTPUT | | | |
|---|---|---|---|---|---|
| x [pixel] | y [pixel] | DatA [count] | DatB [count] | DatC [count] | DatD [count] |
| ooo | ooo | ooo | ooo | ooo | ooo |
| ooo | ooo | ooo | ooo | ooo | ooo |
| ooo | ooo | ooo | ooo | ooo | ooo |
| ooo | ooo | ooo | ooo | ooo | ooo |
| ooo | ooo | ooo | ooo | ooo | ooo |
| ooo | ooo | ooo | ooo | ooo | ooo |
| ooo | ooo | ooo | ooo | ooo | ooo |
| ... | ... | ... | ... | ... | ... |
| ... | ... | ... | ... | ... | ... |

FIG. 9

| DATA | TIME | SENSOR OUTPUT | | | | CALCULATION DATA | | |
|---|---|---|---|---|---|---|---|---|
| | | DatA | DatB | DatC | DatD | POSITION | | TOTAL LOAD |
| | | | | | | x | y | z |
| 1 | $t_1$ | ooo | ooo | ooo | ooo | ooo | ooo | ooo |
| 2 | $t_2$ | ooo | ooo | ooo | ooo | ooo | ooo | ooo |
| 3 | $t_3$ | ooo | ooo | ooo | ooo | ooo | ooo | ooo |
| 4 | $t_4$ | ooo | ooo | ooo | ooo | ooo | ooo | ooo |
| 5 | $t_5$ | ooo | ooo | ooo | ooo | ooo | ooo | ooo |
| 6 | $t_6$ | ooo | ooo | ooo | ooo | ooo | ooo | ooo |
| 7 | $t_7$ | ooo | ooo | ooo | ooo | ooo | ooo | ooo |
| 8 | $t_8$ | ooo | ooo | ooo | ooo | ooo | ooo | $Z_0$ |
| 9 | $t_9$ | ooo | ooo | ooo | ooo | ooo | ooo | $Z_1$ |
| 10 | $t_{10}$ | ooo | ooo | ooo | ooo | ooo | ooo | $Z_2$ |

INPUT DEVICE AND DISPLAY APPARATUS

CLAIM OF PRIORITY

This application is a Continuation of international Application No. PCT/JP2011/068515 filed on Aug. 15, 2011, which claims benefit of Japanese Patent Application No. 2010-241313 on Oct. 27, 2010. The entire contents of each application noted above are hereby incorporated by reference.

BACKGROUND OF THE INVENTION

1. Field of the Invention

The present invention relates to an input device having a load sensor under a panel, and particularly an algorithm for correcting position detection.

2. Description of the Related Art

There are input devices that have plural load sensors (force sensors) disposed on different positions under the panel so as to detect the input position on the basis of the load balance when the panel surface is pressed. In the input device, there is a problem in that position detection errors frequently occur due to the effects of disturbance and noise caused by the input device's own weight and vibration of the panel if there is no processing for the effects and thus undesired position data is output even when there is no input of the operation.

Examples of the related art are described in Japanese Unexamined Patent Application Publication Nos. H06-318128, 2005-332063, S63-147217, H05-250086, H08-50528, S63-58528, and H11-305931.

The patent documents do not describe anything about an algorithm for correcting position detection in the input device of which the load sensors are disposed under the panel.

SUMMARY OF THE INVENTION

The present invention provides a correction algorithm for an input device and a display apparatus.

According to an aspect of the present invention, there is provided an input device that has a panel and a plurality of load sensors, which are disposed on different positions under the panel, and is capable of calculating an input position of an operational object, which operates a panel surface, on the basis of sensor outputs which are obtained in accordance with loads of respective load sensors. The input device includes: first processing means for performing zero point correction on the sensor outputs of the respective load sensors when an absolute value of an amount of output change of each load sensor is less than or equal to a predetermined threshold value a during a certain period of measurement time; calculation means for calculating position data and calculating a total load Z of the respective load sensors by using the sensor outputs of the respective load sensors on which the zero point correction is performed; second processing means for removing abnormal data of high-frequency wave noise, in calculation data pieces obtained by the calculation means, by comparing a predetermined threshold value $\beta$ with an absolute value $|dZ/dt|$ of an amount of change in the total load Z, determining that the calculation data pieces are normal when the absolute value $|dZ/dt|$ of the amount of change in the total load Z is less than or equal to the threshold value $\beta$, and determining that the calculation data pieces are abnormal when the absolute value $|dZ/dt|$ is greater than the threshold value $\beta$; third processing means for removing low-load data, in the calculation data pieces obtained by the calculation means, by comparing a predetermined threshold value $\gamma$ with an absolute value $|Z|$ of the total load, determining that an input performed by the operational object is present in the calculation data pieces when the absolute value $|Z|$ of the total load is greater than or equal to the threshold value $\gamma$, and determining that the input is absent when the absolute value $|Z|$ is less than the threshold value $\gamma$; and fourth processing means for removing a predetermined number of first and last data pieces in the respective calculation data pieces successively obtained by the calculation means.

With such a configuration, it is possible to implement a favorable correction algorithm for the input device of which the load sensors are respectively disposed on the different positions under the panel and which performs position detection through the load balance. Thereby, it is possible to prevent the position detection error or the undesired position data (abnormal data), which is generated when there is no input of the operation, from being output.

In the aspect of the present invention, it is preferable that, in the first processing means, a predetermined number of updated data pieces be acquired from each load sensor, and the zero point correction be performed when all the absolute values of the amounts of output changes are less than or equal to the threshold value a.

In the aspect of the present invention, it is preferable that, after the zero point correction is performed on the sensor outputs of the respective load sensors through initial offset correction, the zero point correction be updated by the first processing means. Thereby, it is possible to reliably perform the zero point correction, and thus it is possible to further effectively improve the accuracy of the position detection.

In the aspect of the present invention, it is preferable to obtain X and Y position coefficients of each load sensor, which are necessary when the position data is calculated, as initial setting through a method of least squares on the basis of a plurality of measurement data pieces. The input device according to the aspect of the present invention detects the input position on the basis of change in the load balance. However, there are differences between characteristics of the respective load sensors, distortion of the panel, and the like, and thus the load balance is not kept in the initial state, and this causes deterioration in the position detection accuracy. Accordingly, the X and Y position coefficients of each load sensor as initial setting are calculated in advance through the method of least squares, and the position coefficients are applied when the position data is calculated by the calculation section, whereby it is possible to effectively improve the position detection accuracy.

In the aspect of the present invention, it is preferable that the input device further include fifth processing means for obtaining a moving average of the calculation data pieces and the fifth processing means be performed at a timing earlier than that of the fourth processing means. Thereby, it is possible to remove electric white noise, and thus it is possible to appropriately obtain the moving average of all the calculation data pieces.

In the aspect of the present invention, it is preferable that the load sensors be disposed at four corners of the panel.

Further, according to another aspect of the present invention, a display apparatus includes: the above-described input device; and a display that is disposed under the panel which is transparent. Screen display is updated on the basis of the position data which is obtained through respective processing means.

Thereby, it is possible to appropriately prevent the screen display, which is based on the position detection error, or the screen display, which is provided when there is no input of the operation, from being updated. Thus, on the basis of the pressed input position, it is possible to reliably update the screen display.

BRIEF DESCRIPTION OF THE DRAWINGS

FIG. 4 is a block diagram of the input device according to the embodiment;

FIG. 8 is a measurement table used when X and Y position coefficients are calculated; and FIG. 9 is a table illustrating sensor outputs of the respective load sensors and calculation data calculated in step ST4 of FIG. 5.

DESCRIPTION OF THE PREFERRED EMBODIMENTS

Figure 1:
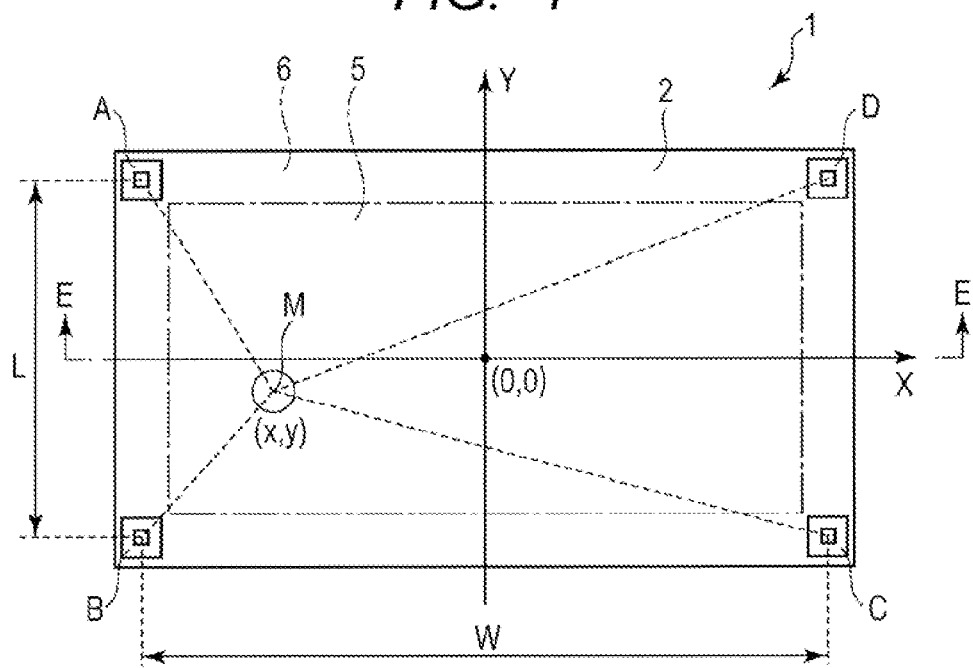
FIG. 1 is a top plan view schematically illustrating an input device (touch panel) and a display apparatus according to the embodiment.
Figure 2:
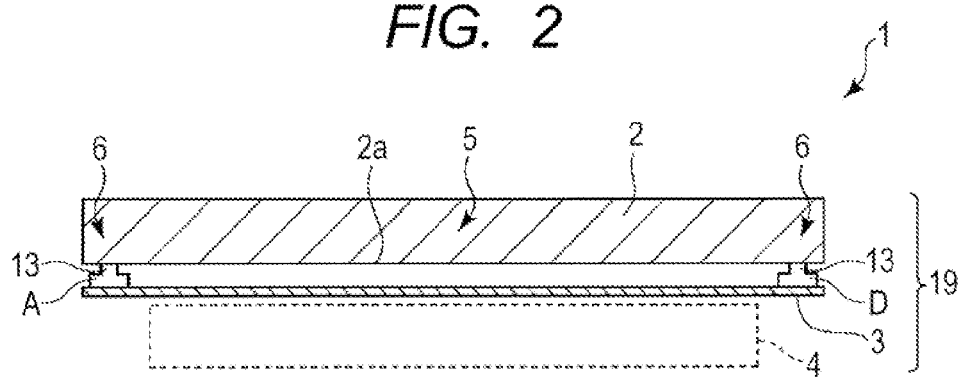
FIG. 2 is a partial vertical cross-sectional view of a part cut along the line E-E shown in FIG. 1 as viewed from the direction of the arrow.
Figure 3A:
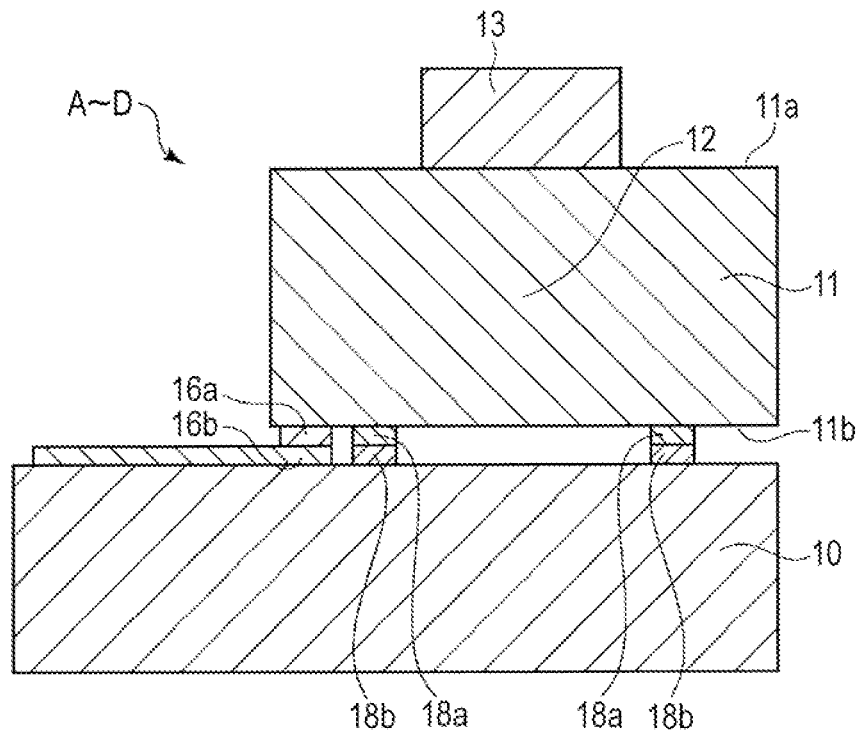
FIG. 3A is a partially enlarged vertical cross-sectional view of a load sensor (force sensor) according to the embodiment.
Figure 3B:
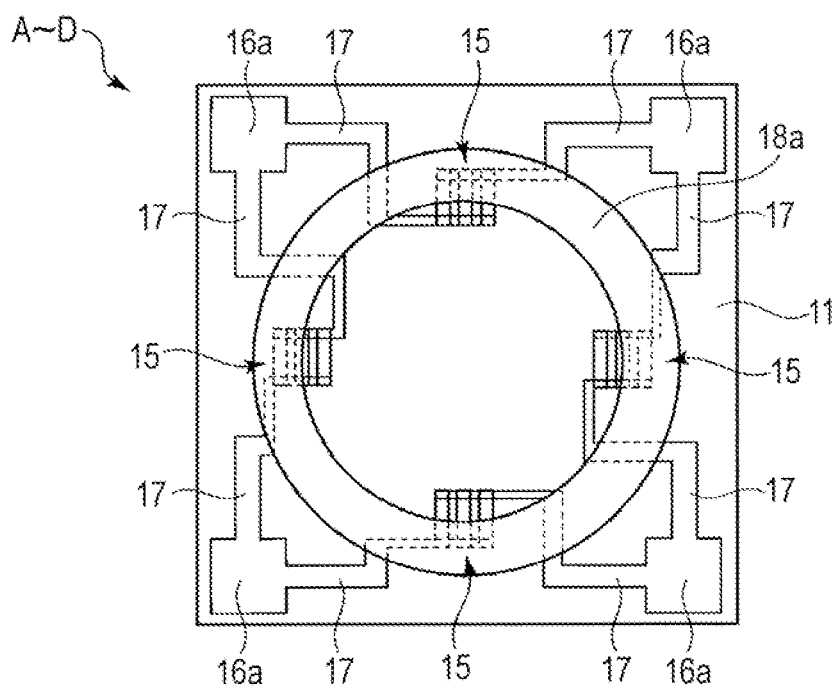
FIG. 3B is a backside view of a sensor substrate constituting the load sensor.

FIG. 1 is a top plan view schematically illustrating an input device (touch panel) and a display apparatus according to the embodiment. FIG. 2 is a partial vertical cross-sectional view of a part cut along the line E-E shown in FIG. 1 as viewed from the direction of the arrow. FIG. 3A is a partially enlarged vertical cross-sectional view of a load sensor (force sensor) according to the embodiment. FIG. 3B is a backside view of a sensor substrate constituting the load sensor. FIG. 4 is a block diagram of the input device according to the embodiment.

The input device 1 according to the embodiment (touch panel) includes, as shown in FIGS. 1 and 2, a panel 2 formed of a transparent glass substrate and the like, and plural load sensors (force sensors) A to D disposed under the panel 2.

Further, in the embodiment, the configuration, in which a liquid crystal display 4 is provided under the input device 1, is a "display apparatus 19".

As shown in FIG. 2, the load sensors A to D are provided on a transparent supporting plate 3. Although not shown in the drawing, for example, a hole opposed to the liquid crystal display 4, which is disposed on the lower side thereof, may be formed at the center of the supporting plate 3.

Here, "transparency" or "translucency" indicates a state where the visible light transmittance is greater than or equal to 60% (preferably greater than or equal to 80%). Furthermore, it is preferable that the haze value be less than or equal to 6.

As shown in FIG. 1, the four load sensors A to D are disposed at the four corners of the panel 2.

For example, in the panel 2, a display region 5 is provided in the center thereof, and a decorating region 6 is provided around the display region 5.

In the decorating region 6, for example, a decorating layer (not shown in the drawing) is provided on the lower side of the panel 2, and is formed to be not translucent. In contrast, in the display region 5, the decorating layer is not provided, and is formed to be translucent. As shown in FIGS. 1 and 2, the load sensors A to D are disposed in the decorating region 6. Further, as shown in FIG. 2, the liquid crystal display 4 is disposed to be opposed to the display region 5 in the height direction.

It should be noted that the load sensors A to D may be made of a transparent material. Thereby, if there is no problem even when the liquid crystal display 4 and the load sensors A to D are overlapped in the height direction, the display region 5 may be expanded up to the positions at which the load sensors A to D are provided.

The structure of the load sensors A to D will be described with reference to FIG. 3.

As shown in FIG. 3A, each of the load sensors A to D has a sensor substrate 11, a base substrate 10, and a pressure receiving portion 13.

The center of the sensor substrate 11 is a displacement portion 12 that is displaced by a load in the height direction. As shown in FIG. 3A, the pressure receiving portion 13, which receives a load from the outside, is formed on the surface (upper surface) 11a of the sensor substrate 11. The pressure receiving portion 13 and the sensor substrate 11 may be separately formed, and may be integrally formed.

As shown in FIGS. 3A and 3B, plural piezoresistors 15 as distortion detection elements, plural sensor-side electric connection portions 16a, plural circuit wire portions 17, and a sensor-side supporting portion 18a are provided on the back surface (lower surface) 11b of the sensor substrate 11.

As shown in FIG. 3A, a base-side electric connection portion 16b, a base-side supporting portion 18b, and the like are formed on the front surface (upper surface) of the base substrate 10.

The piezoresistors 15 shown in FIG. 3B are provided at positions along the peripheral portion of the displacement portion 12.

The sensor substrate 11 and the base substrate 10 are electrically connected through the sensor-side electric connection portion 16a and the base-side electric connection portion 16b.

Further, the sensor-side supporting portion 18a and the base-side supporting portions 18b are pressure-bonded, and thereby the sensor substrate 11 and the base substrate 10 are bonded.

The electric connection portions 16a and 16b and the supporting portions 18a and 18b may be formed of the same conductive material or metal material.

Further, the base substrate 10 and the sensor substrate 11 may be formed of silicon.

As shown in FIG. 2, each of the load sensors A to D is disposed such that the pressure receiving portion 13 is in direct contact with the lower surface 2a of the panel 2.

When an operator performs an input operation by pressing the display region 5 of the panel 2 with an operational object such as an operator's finger or a pen, each of the load sensors A to D is subjected to a load by the pressure receiving portion 13, and the displacement portion 12 is displaced. Then, in accordance with the amount of displacement, the electrical resistances of the plural piezoresistors 15 are changed. When the electrical resistance values of the two piezoresistors 15 of the four piezoresistors 15 increase, the piezoresistors 15 are formed such that the electrical resistance values of the remaining two piezoresistors 15 decrease. In addition, each piezoresistor 15 constitutes a bridge circuit, and the change in the resistance of each piezoresistor 15 causes the change in the midpoint potential of the bridge circuit. Thereby, it is possible to obtain the sensor output (voltage value).

For example, when an operator presses the operation point M shown in FIG. 1, individual loads are respectively applied to the load sensors A to D disposed at different positions under the panel 2. Then, on the basis of the sensor outputs obtained from the load sensors A to D, it is possible to detect the operation point (input position) M.

The operation point (input position) M can be calculated by a calculation section 22 (refer to FIG. 4) in a control section (IC) 20 that acquires the sensor outputs from the load sensors A to D and performs various processes. As shown in FIG. 4, the control section 20 includes not only the calculation section 22 but also a table 21, a high-frequency wave noise determination section 24, a data smoothing section 25, a low-load determination section 26, and a data header/trailer removing section 27. It should be noted that the configuration diagram in the control section 20 shown in FIG. 4 is conceptual, and the configuration of the control section 20 is not limited to that of FIG. 4 if it is possible to execute the operation flow described in FIG. 5 with the configuration.

Hereinafter, the operation flow of the input device according to the embodiment will be described mainly referring to FIGS. 5 to 7.

Figure 5:
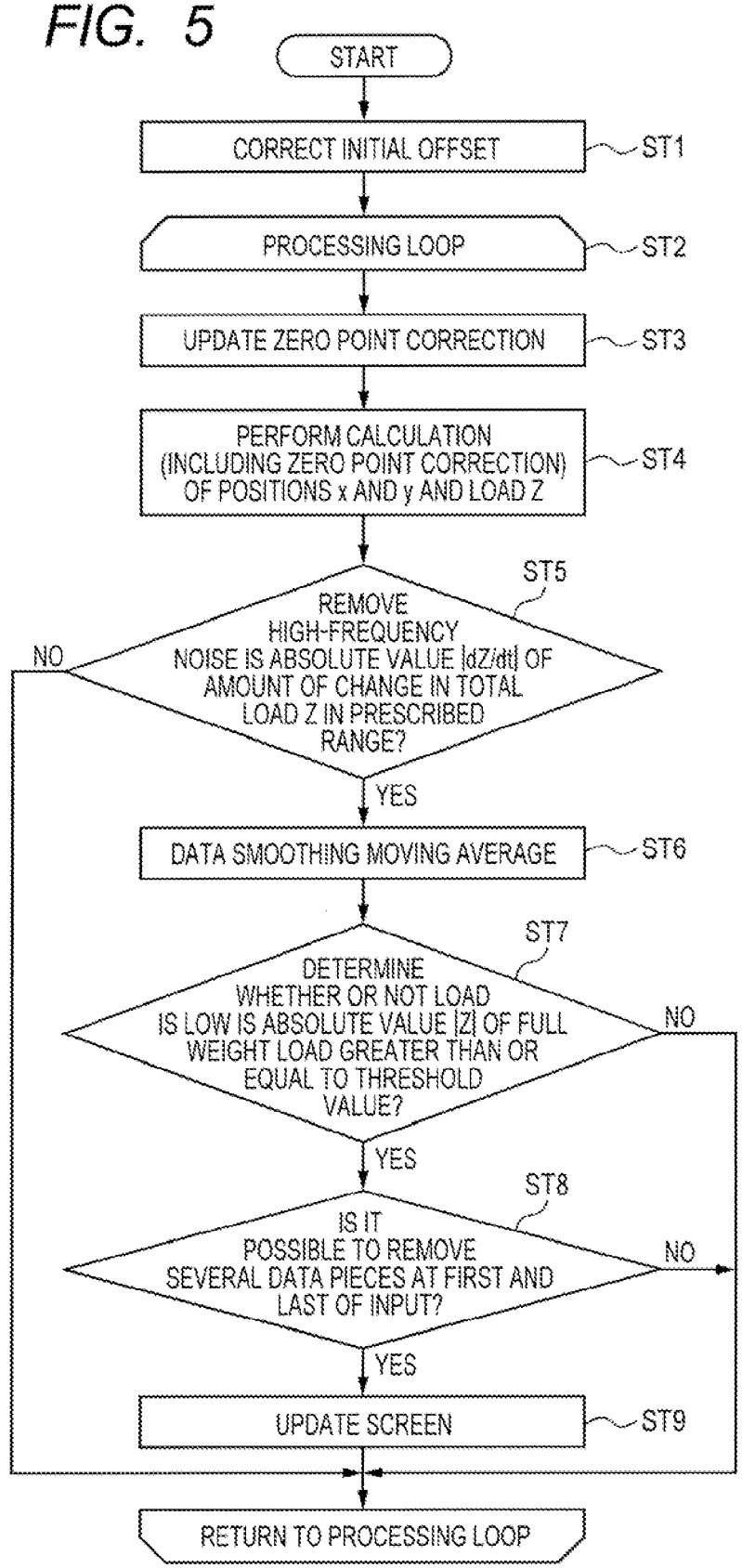
FIG. 5 is an operation flow of the input device according to the embodiment.

In step ST1 shown in FIG. 5, initial offset correction is performed. For example, the initial offset correction (step ST1) shown in FIG. 5 is performed on the sensor outputs of the load sensors A to D once after power is applied to the input device 1. The zero point correction in step ST1 of FIG. 5 is for adjusting the sensor outputs to zero when the sensor outputs of the load sensors A to D after application of power are not zero and disperse.

The zero point correction value obtained by the initial offset correction is reflected in the sensor output obtained from each of the load sensors A to D, thereby creating the table 21. That is, each sensor output of the table 21 is subjected to the zero point correction.

Figure 7:
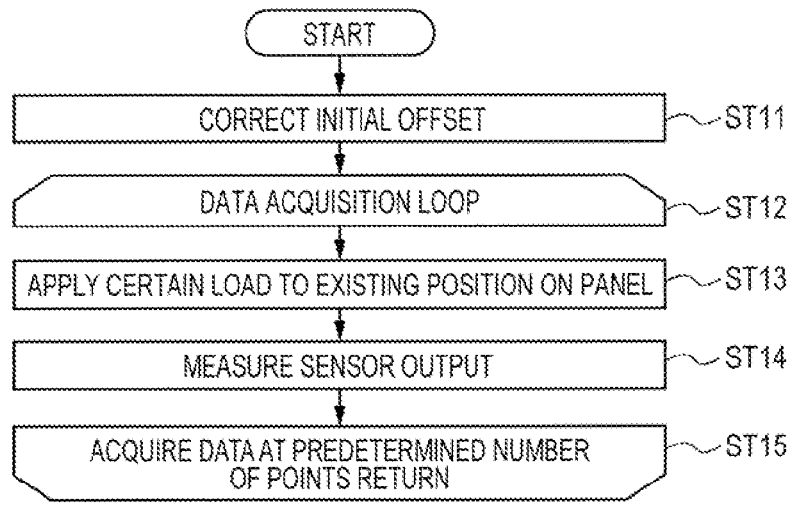
FIG. 7 is an initial measurement flow of the input device according to the embodiment.

Further, it is preferable to execute the initial measurement flow shown in FIG. 7 as initial setting. The initial setting is performed, for example, before the input device 1 is shipped. Alternatively, a general user who purchases the input device 1 may perform the initial setting. It should be noted that it suffices to perform the initial setting only once.

First, in FIG. 7, when power is applied to the input device 1, the initial offset correction described in FIG. 5 is performed (step ST11).

Subsequently, the flow advances to the data acquisition loop (step ST2). First, a certain load is applied to the existing position on the panel 2 (step ST3).

Then, in step ST14, the sensor outputs (DatA, DatB, DatC, and DatD) of the load sensors A to D are measured.

Such measurement data acquisition is repeated at different exiting positions on the panel 2, thereby obtaining measurement data of at least four points or more (step ST15). The reason why the number of points is four or more is that the variable is "4".

From the table 21 shown in FIG. 4, it is possible to obtain the measurement table (schematic diagram) shown in FIG. 8. Here, the values of the sensor outputs and the positions x and y of the measurement table shown in FIG. 8 are shown as "000", but this means that "the numerical values are not specified".

As described above, the "position x and position y" are existing positions, and thus are fixed value. The "DatA" represents the sensor output of the load sensor A, the "DatB" represents the sensor output of the load sensor B, the "DatC" represents the sensor output of the load sensor C, and the "DatD" represents the sensor output of the load sensor D. The sensor outputs (DatA, DatB, DatC, and DatD) shown in FIG. 8 are values in which the zero point correction based on the initial offset correction of step ST11 is reflected.

By using the measurement table of FIG. 8, it is possible to calculate X position coefficients (Ax, Bx, Cx, and Dx) and Y position coefficients (Ay, By, Cy, and Dy) through a method of least squares as a linear equation of four variables.

The input device 1 of the embodiment detects the input position on the basis of the change in the load balance. However, there are differences between characteristics of individual load sensors A to D, distortion of the panel 2, and the like, and thus the load balance is not kept in the initial state, and this causes deterioration in the position detection accuracy. Accordingly, the X and Y position coefficients of each of the load sensors A to D as initial setting are calculated in advance through the method of least squares, and the position coefficients are applied when the position data (x,y) is calculated by the calculation section 22 (refer to FIG. 4), whereby it is possible to effectively improve the position detection accuracy.

The X position coefficients (Ax, Bx, Cx, and Dx) and the Y position coefficients (Ay, By, Cy, and Dy), which are obtained by the initial setting, are stored in the control section 20.

In the embodiment, through a normal routine after the initial setting, the initial offset correction (step ST1) of FIG. 5 is performed, and thereafter the flow advances to the processing loop (step ST2). In the processing loop (step ST2), steps ST3 to ST9 are repeatedly performed.

First, in step ST3 (first processing means) of FIG. 5, when the absolute value of the amount of output change of each of the load sensors A to D is less than or equal to a predetermined threshold value a during a certain period of measurement time, the zero point correction is updated.

Figure 6:
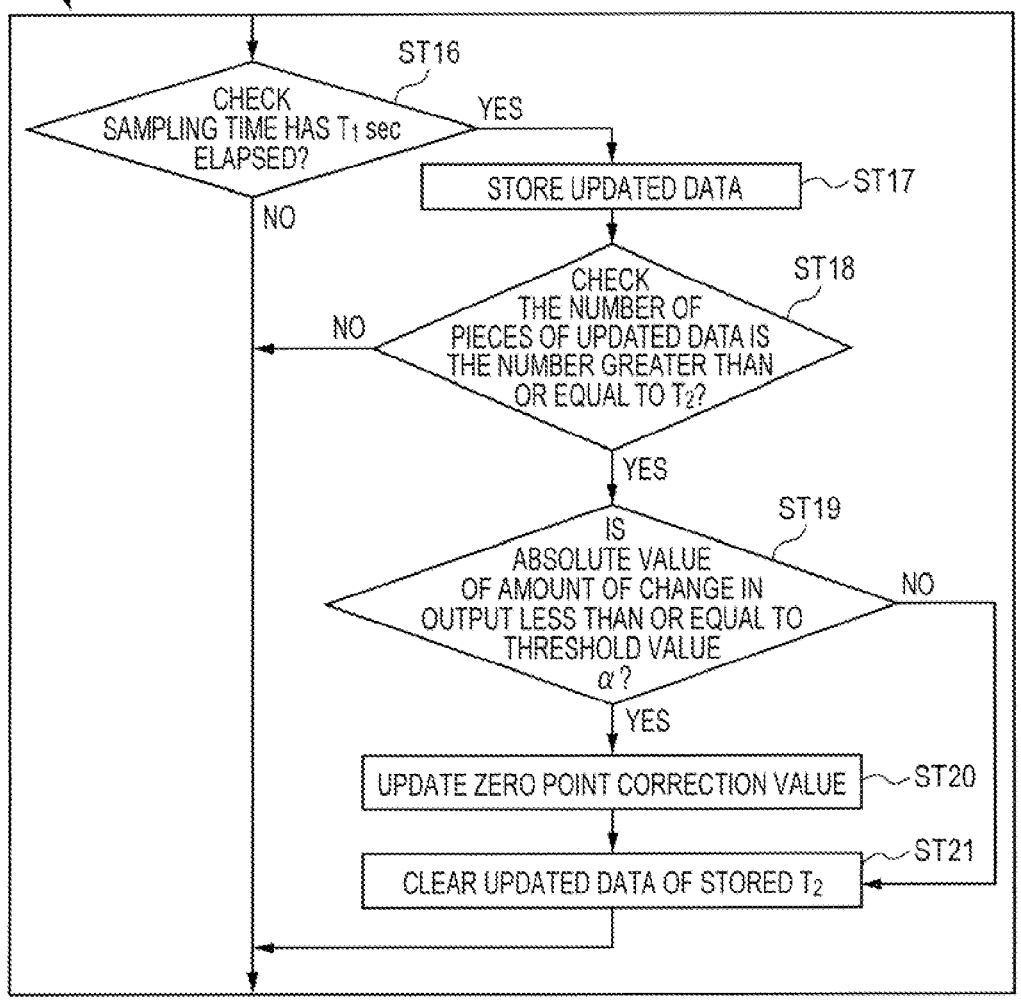
FIG. 6 is a specific flow illustrating contents of a process, which is performed in step ST3 shown in FIG. 5, in detail.

For example, step ST3 (first processing means) shown in FIG. 5 is divided into plural steps shown in FIG. 6.

First, in step ST16 of FIG. 6, through sampling time check, it is determined whether or not T1 (sec) has elapsed.

In step ST16, the sensor outputs (DatA, DatB, DatC, and DatD) of the load sensors A to D obtained whenever the time of T1 has elapsed are stored as updated data of the zero point correction.

Here, at this time, the data pieces 1 to 10 shown in FIG. 9 are obtained. Each of the data pieces 1 to 10 can be obtained for each of time interval of Δt. The zero point correction based on the initial offset correction is reflected in the sensor outputs (DatA, DatB, DatC, and DatD) of the data pieces 1 to 10.

Here, the data pieces obtained at the time interval (larger than the time interval of Δt) of T1 are, for example, data pieces 1, 4, 7, and 10. Accordingly, the data pieces 1, 4, 7, and 10 are stored as updated data pieces (step ST17 of FIG. 6).

Subsequently, in step ST18 of FIG. 6, it is determined whether or not the updated data is greater than or equal to $T_2$ ($T_2$ is plural). Unless the measurement data is greater than or equal to $T_2$, until the data is greater than or equal to $T_2$, the updated data is kept stored. If the measurement data is greater than or equal to $T_2$, the flow advances to step ST19.

For example, if the updated data number T2 is 4 in step ST18 of FIG. 6, the data pieces 1, 4, 7, and 10 are stored, and then the flow advances to step ST19.

In step ST19 of FIG. 6, it is determined whether or not all the absolute values of the amounts of output change in the updated data pieces of the load sensors A to D is less than or equal to the predetermined threshold value α. Here, the unit of the threshold value α is, for example, "LSB".

Here, the "amount of output change" means the amount of change from a reference value. In the embodiment, for example, the output zero can be set as the "reference value". Further, the amount of output change in each measurement data may be positive (plus) or negative (minus), and the amount of output change is set as an absolute value when compared with the threshold value α.

In step ST19 of FIG. 6, if it is determined that all the absolute values of the amounts of output change in the measurement data pieces are less than or equal to the predetermined threshold value α, the flow advances to step ST20. Then, in step ST20, the zero point correction value is updated. In step ST20, for example, the updated data greater than or equal to T2 is averaged for each amount of output change of the load sensors A to D, and the average value of the amounts of output change is added to each initial zero point correction value of the load sensors A to D.

The updated zero point correction values are reflected in the data pieces acquired after the data 10 shown in FIG. 9.

When step ST20 ends, in step ST21, the updated data pieces greater than or equal to stored T2 are cleared in order to update the zero point correction, and the flow returns to step ST16 again. Further, in step ST19, if it is determined that the absolute value of the amount of output change in any of the updated data pieces is greater than the predetermined threshold value α, the flow advances to step ST21, the updated data pieces, which are stored, are cleared, and the flow returns to step ST16.

The update of the zero point correction is performed in the step of FIG. 6, and is thus performed regardless of whether steps ST4 to ST9 are performed.

The update of the zero point correction of FIG. 6 and step ST3 shown in FIG. 5 are performed in order to correct (update) deviation in the zero point correction caused by the temperature drift and the like in accordance with the elapse of time or the own weight of the panel 2 when the input device 1 is tilted.

It is possible to perform only the zero point correction (step ST3 of FIG. 5, FIG. 6) according to the elapse of time without performing the initial offset correction (step ST1) shown in FIG. 5. However, it is preferable that, after the zero point correction is performed on the basis of the initial offset correction, the zero point correction be updated.

If the initial offset correction is not performed, the zero point correction is not reflected in the data pieces (for example, the data pieces 1 to 10 of FIG. 9) which are present until the updated data pieces greater than or equal to T2 are stored in step ST18 of FIG. 6 after power is applied. In addition, when an operator performs an input operation before the updated data pieces greater than or equal to T2 are stored in step ST18 of FIG. 6 immediately after power is applied, the position detection is performed in a state where the zero point correction is not performed, and this causes deterioration in accuracy of the position detection. Accordingly, in order to improve the accuracy of the position detection, it is preferable to use processing means that updates the zero point correction after the zero point correction is performed on the basis of the initial offset correction.

Next, in step ST4 shown in FIG. 5, the calculation section 22 shown in FIG. 4 calculates the position data and the total load Z of the load sensors A to D.

The sensor outputs (DatA, DatB, DatC, and DatD) from the table 21 shown in FIG. 4 are sent to the calculation section 22. The sensor outputs sent to the calculation section 22 are subjected to the zero point correction (steps ST1 and ST3).

The calculation section 22 calculates the position x, the position y, and the total load Z on the basis of the following Numerical Expression 1.

$$x = \left(Ax \cdot \frac{DatA}{Z} + Bx \cdot \frac{DatB}{Z} + Cx \cdot \frac{DatC}{Z} + Dx \cdot \frac{DatD}{Z}\right) \times \frac{W}{2}$$

$$y = \left(Ay \cdot \frac{DatA}{Z} + By \cdot \frac{DatB}{Z} + Cy \cdot \frac{DatC}{Z} + Dy \cdot \frac{DatD}{Z}\right) \times \frac{L}{2}$$

$$Z = DatA + DatB + DatC + DatD$$

Numerical Expression 1

Here, W represents the width dimension in the X direction in FIG. 1, and is defined as the width dimension between the centers of the load sensor B (load sensor A) and the load sensor C (load sensor D) as shown in FIG. 1. Further, L represents the length dimension in the Y direction in FIG. 1, and is defined as the width dimension between the centers of the load sensor A (load sensor D) and the load sensor B (load sensor C) as shown in FIG. 1. Furthermore, the X position coefficients (Ax, Bx, Cx, and Dx) and the Y position coefficients (Ay, By, Cy, and Dy) can be calculated by the method of least squares in accordance with the initial measurement flow of FIG. 7.

Thereby, as shown in FIG. 9, it is possible to obtain the table of the time, the sensor outputs, and the calculation data pieces (the position data pieces x and y and the total load Z).

The calculation section 22 calculates the position data pieces x and y and the total load Z whenever acquiring the sensor outputs (DatA, DatB, DatC, and DatD). At this time, it is not yet determined whether or not a person performs the input operation. Therefore, during and after step ST5, the calculated calculation data pieces are appropriately adjusted.

First, in step ST5, if the absolute value |dZ/dt| of the amount of change in the total load Z of the load sensors A to D is less than or equal to a predetermined threshold value β, it is determined that the calculation data pieces are normal. In contrast, if the absolute value is greater than the threshold value β, it is determined that the data pieces are abnormal, and the abnormal data with high-frequency wave noise is removed (second processing means). Further, the amount of change in the total load Z of the load sensors A to D may be positive or negative like the amount of output change of each load sensor, and is thus set as an absolute value when compared with the threshold value β.

In step ST5, for example, three latest calculation data pieces are acquired consistently, and the process of the step is performed. For example, in a stage in which the data 10 shown in FIG. 9 is accurately acquired, the data pieces 8 to 10 are sent from the table 21 of FIG. 4 to the high-frequency wave noise determination section 24, and if all the dZ/dt (absolute values) of |load Z0−load Z1| and |load Z1−load Z2| are greater than the threshold value β (the unit is, for example, LSB/ms), the high-frequency wave noise determination section 24 determines that the load Z1 is abnormal data, and removes the data 9 from the table 21.

That is, if the absolute value |dZ/dt| of the amount of change in the total load Z is significantly large, it is determined that the load is not generated by a normal input operation of an operator but generated by impulsive effect of electrical abnormal noise or a shock to the panel 2. Hence, if the absolute value |dZ/dt| of the amount of change in the total load Z is greater than the predetermined threshold value β, it is determined that the load is not based on a person's operation but based on the high-frequency wave noise, is regarded as abnormal data, and is removed.

In contrast, if the absolute value |dZ/dt| of the amount of change in the total load Z is less than or equal to the predetermined threshold value β, the flow advances to step ST6.

In step ST6, in order to remove white noise, the calculation data pieces are subjected to the moving average process and thereby smoothed by the data smoothing section 25 of FIG. 4 (fifth processing means). The calculation of the moving average is performed by respectively averaging the plural successive position data pieces x and y and total load Z. When the moving average process is performed on the data 10 shown in FIG. 9, for example, the moving average of the data 10 can be obtained by using the data 10 and the previous three data pieces 7 to 9. The data smoothing is performed on all the calculation data pieces.

However, in step ST6, it is preferable that the position data pieces x and y and the total loads Z be subjected to the moving average process, but the total loads Z may be subjected to the moving average as necessary.

In addition, as described later, there is a step (step ST8 of FIG. 5: fourth processing means) of removing a predetermined number of first and last calculation data pieces of the successive calculation data pieces obtained by the calculation section 22, but it is preferable that the data smoothing processing (fifth processing means) be performed before the step of removing the previous and subsequent calculation data pieces. The reason is that data smoothing is reliably performed on all the calculation data pieces used in screen update (step ST9 of FIG. 5).

Next, in step ST7 of FIG. 5, in the low-load determination section 26 of FIG. 4, if the absolute value |Z| of the total load of the load sensors A to D is greater than or equal to a predetermined threshold value γ, it is determined that, in the calculation data, there is an input performed by using the operational object such as a finger or a pen. In contrast, if the absolute value is less than the threshold value γ, it is determined that there is no input, and the data determined as the low-load non-input data is removed (third processing means).

As shown in FIG. 9, regardless of whether or not a person's operation is present, on the basis of the acquired sensor outputs (DatA, DatB, DatC, and DatD), the calculation section 22 calculates the position data pieces x and y and the total load Z.

At this time, in a similar manner to step ST3 of FIG. 5, by performing the update of the zero point correction in accordance with the elapse of time, the high-frequency wave noise is removed when there is no input of the operation, and thereby the sensor outputs (DatA, DatB, DatC, and DatD) are adjusted to be approximate to zero. However, if any one of the sensor outputs (DatA, DatB, DatC, and DatD) is not zero, the total load Z is output even though the load is infinitesimal.

At this time, up to step ST6 of FIG. 5, the low-load side is not determined. For this reason, in step ST7, normally, there is provided the threshold value γ as the minimum of the absolute value |Z| of the total load that can be obtained when a person performs an operation. Thereby, if the absolute value |Z| of the total load is less than the threshold value γ, it is determined the load is based on low-load noise, and the load is regarded as non-input data, and is removed.

If the absolute value |Z| of the total load is greater than or equal to the threshold value γ, the flow advances to step ST8. If the absolute value |Z| of the total load is less than the threshold value γ, the flow returns to step ST2. It should be noted that the value of the total load Z may be positive or negative and is thus set as an absolute value when compared with the threshold value γ.

Subsequently, in step ST8, in the data header/trailer removing section 27 of FIG. 4, a predetermined number of first and last data pieces are removed from the data pieces successively obtained (fourth processing means).

In other words, when the data pieces 1 to 10 shown in FIG. 9 are data pieces successively obtained, for example, first data pieces 1 to 3 and the rest data pieces 8 to 10 are removed, and only the data pieces 4 to 7 are made to remain.

For example, at the moment the operational object such as a finger or a pen touches the surface of the panel 2, and at the moment the operational object is separated from the panel 2, the position detection error tends to occur due to vibration or distortion of the panel 2. Accordingly, in step ST8, a predetermined number of first and last data pieces are removed.

Next, in step ST9, the display screen, which is displayed through the panel 2 of the liquid crystal display 4 shown in FIG. 2, is updated. At this time, at least the position data pieces x and y are transmitted from the control section 20 shown in FIG. 4 to the driving section (not shown in the drawing) of the liquid crystal display 4. The data of the total load Z may also be transmitted as necessary.

After the update of the screen, the flow returns to the processing loop ST2 again.

In the embodiment, for the input device in which the plural load sensors A to D are disposed under the panel 2, it is possible to establish a favorable correction algorithm based on the operation flow of FIG. 5. Thereby, it is possible to prevent the position detection error or the undesired abnormal data from being output.

In the embodiment, it is not indispensable to perform the operation flow shown in FIG. 5 in the order shown in FIG. 5. For example, step ST6 may be set after step ST7, and step ST5 may be set after step ST7.

It should be understood by those skilled in the art that various modifications, combinations, sub-combinations and alterations may occur depending on design requirements and other factors insofar as they are within the scope of the appended claims of the equivalents thereof.

What is claimed is:

1. An input device having a panel and a plurality of load sensors disposed under the panel at different positions, each of the load sensors outputting a sensor output according to a load applied thereto, the input device being configured to calculate, based on the sensor outputs, an input position of an operational object which operates a panel surface, the input device comprising:
   a first processing section configured to perform zero point correction on the sensor outputs when an absolute value of an amount of change in the sensor output of each load sensor is less than or equal to a predetermined threshold value α during a certain period of measurement time;
   a calculation section configured to calculate and obtain calculation data representing the input position and a total load Z of the load sensors using the sensor outputs on which the zero point correction has been performed;
   a second processing section configured to remove high-frequency noises in the calculation data by comparing an absolute value |dZ/dt| of an amount of change in the total load Z with a predetermined threshold value β, determining that the calculation data is normal if the absolute value |dZ/dt| is less than or equal to the threshold value β, and determining that the calculation data is abnormal if the absolute value |dZ/dt| is greater than the threshold value β;
   a third processing section configured to remove low-load data in the calculation data by comparing an absolute value |Z| of the total load Z with a predetermined threshold value γ, determining that the calculation data indicates an input performed by the operational object if the absolute value |Z| is greater than or equal to the threshold value γ, and determining that the input by the operational object is absent if the absolute value |Z| is less than the threshold value γ; and a fourth processing section configured to remove a predetermined number of first and last data samples from a series of successive data samples of the calculation data obtained by the calculation section.

2. The input device according to claim 1, wherein the first processing section obtains a predetermined number of updated data samples from each load sensor, and performs the zero point correction if the absolute value of the amount of change in all of the sensor outputs is less than or equal to the threshold value α.

3. The input device according to claim 1, wherein the first processing section updates the zero point correction after an initial zero point correction is performed on the sensor outputs through an initial offset correction.

4. The input device according to claim 1, wherein the input device is further configured to obtain X and Y position coefficients of each load sensor as an initial setting using least squares of a plurality of measurements, the X and Y position coefficients being used in calculating the position data.

5. The input device according to claim 1, further comprising a fifth processing section configured to obtain a moving average of data samples of the calculation data, wherein the fifth processing section performs the moving average before the fourth processing section removes the predetermined number of the data samples.

6. The input device according to claim 1, wherein the load sensors are disposed at four corners of the panel.

7. A display apparatus comprising:
the input device according to claim 1, the panel being transparent; and
a display disposed under the panel,
wherein a display screen is updated based on the position data which is obtained by the calculation section and the first through fourth processing sections of the input device.

8. A method for detecting an input position of an operational object operating a surface of a panel in an input device, the input device having the panel and a plurality of load sensors disposed under the panel at different positions, each of the load sensors outputting a sensor output according to a load applied thereto, the method calculating the input position based on the sensor outputs, the method comprising:
performing zero point correction on the sensor outputs when an absolute value of an amount of change in the sensor output of each load sensor is less than or equal to a predetermined threshold value α during a certain period of measurement time;
calculating and obtaining calculation data representing the input position and a total load Z of the load sensors using the sensor outputs on which the zero point correction has been performed;
removing high-frequency noises in the calculation data by comparing an absolute value |dZ/dt| of an amount of change in the total load Z with a predetermined threshold value β, determining that the calculation data is normal if the absolute value |dZ/dt| is less than or equal to the threshold value β, and determining that the calculation data is abnormal if the absolute value |dZ/dt| is greater than the threshold value β;
removing low-load data in the calculation data by comparing an absolute value |Z| of the total load Z with a predetermined threshold value γ, determining that the calculation data indicates an input performed by the operational object if the absolute value |Z| is greater than or equal to the threshold value γ, and determining that the input by the operational object is absent if the absolute value |Z| is less than the threshold value γ; and
removing a predetermined number of first and last data samples from a series of successive data samples of the calculation data.

9. The method according to claim 8, wherein in the performing the zero point correction, a predetermined number of updated data samples are obtained from each load sensor, and the zero point correction is performed if the absolute value of the amount of change in all of the sensor outputs is less than or equal to the threshold value α.

10. The method according to claim 8, wherein the zero point correction is updated after an initial zero point correction is performed on the sensor outputs through an initial offset correction.

11. The method according to claim 8, further comprising:
obtaining X and Y position coefficients of each load sensor as an initial setting using least squares of a plurality of measurements, the X and Y position coefficients being used in calculating the position data.

12. The method according to claim 8, further comprising:
obtaining a moving average of data samples of the calculation data, before removing the predetermined number of the data samples.

13. The method according to claim 8, wherein the load sensors are disposed at four corners of the panel.

* * * * *